Nov. 28, 1933.  R. R. WOLFE  1,937,373
ALTERNATING CURRENT MOTOR
Filed Oct. 9, 1931
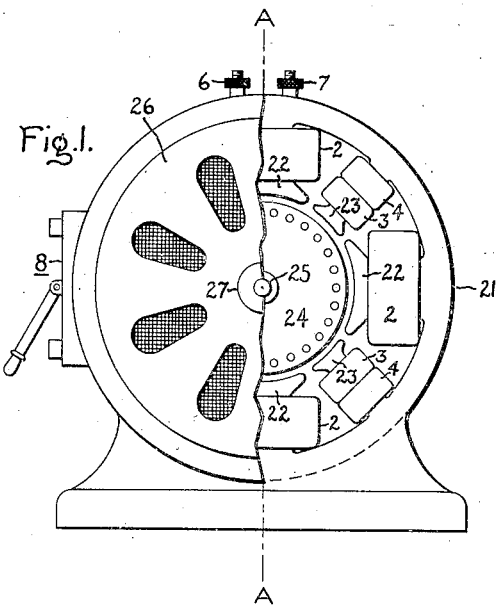
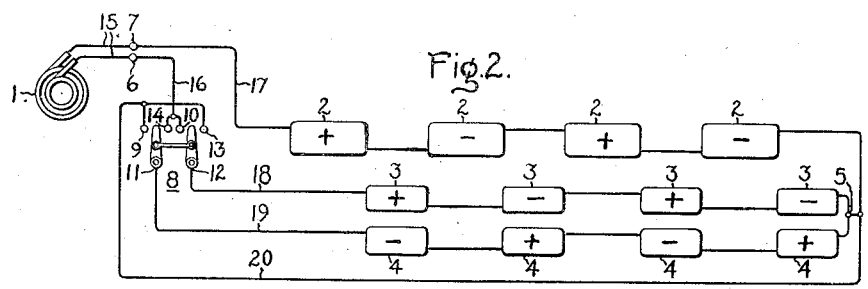
Inventor:
Richard R. Wolfe,
by Charles E. Tullar
His Attorney.

Patented Nov. 28, 1933

1,937,373

UNITED STATES PATENT OFFICE 1,937,373

ALTERNATING CURRENT MOTOR

Richard R. Wolfe, Washington, D. C., assignor to General Electric Company, a corporation of New York Application October 9, 1931. Serial No. 567,894

10 Claims. (Cl. 172—278)

My invention relates to improvements in alternating current motors of the type generally known as induction motors and has for its object to provide a motor of this type whose armature may be reversed for rotation in one direction or the other.

A further object of my invention is to provide a motor of this type which requires a minimum number of windings, and in which the windings are arranged in such a manner that all of the windings are effective for producing rotation of the armature in one direction or the other.

A further object of my invention is to provide a motor of this type which is simple in construction, economical to manufacture, requires a minimum amount of copper, and is efficient in operation.

Non-reversible alternating current induction motors of the shaded pole type are well known in the art. Such motors usually have salient poles on the stator and about half of the face of each pole is surrounded by a low-resistance short-circuited winding known as a "shading coil". The currents induced in the short-circuited windings produce a flux displaced both in time phase and space phase with respect to the main flux and thus produce a shifting field for rotation of the armature. The operation of such motors is well understood in the art and requires no further explanation here. Several modifications of such motors have been proposed heretofore in order to facilitate their reversal for operation in either direction. One of these modifications as shown in German Patent No. 97,514, issued to A. Kolbe, June 9, 1898, and in French Patent No. 602,928, issued to Ateliers De Construction Oerlikon, April 3, 1926, comprises the use of two auxiliary coils which surround adjacent halves of the faces of each pole. These auxiliary coils may be selectively short circuited for producing a shifting field in one direction or the other. Another modification is shown in U. S. Patent 1,770,905, issued to E. L. Barrett, July 22, 1930. In this latter modification the main windings, rather than the shading coils are duplicated and are arranged in such a manner that the sets of main windings may be selectively energized for producing a shifting field in one direction or the other.

It will be noted that in all of the modified motors above described there is an idle set of windings, either auxiliary or main windings, when the armature is rotating in either direction. According to my invention the windings of my improved motor are disposed upon the magnetic field structure and connected in such manner that all of them carry current and take part in the operation of the motor for either direction of rotation. This is accomplished by the arrangement hereinafter described and a new and improved motor requiring only a minimum amount of copper is thus provided.

The features of my invention which are believed to be novel and patentable are set forth in the appended claims. My invention, both as to its organization and method of operation, together with further objects and advantages thereof, will be best understood by reference to the following description taken in connection with the accompanying drawing in which Fig. 1 is an end elevation of a motor embodying the features of my invention; Fig. 2 is a schematic diagram of the coils and switch connections of the motor shown in Fig. 1.

In the drawing, I have illustrated the features of my invention as being embodied in a four-pole single-phase induction motor, the general elements of which are well known to those skilled in the art. It will be understood that any even number of poles may be used. The primary which is preferably made the stator consists of a frame 21 on which are mounted the inwardly extending laminated main pole pieces 22. Intermediate these main pole pieces 22 are placed the auxiliary pole pieces 23. The cross sectional area of the auxiliary pole pieces is preferably made substantially smaller than that of the main pole pieces. End shield 26 has been shown as partially cut away along section A—A in Fig. 1 to show the arrangement of the pole pieces.

Main windings 2 are disposed upon each of the main pole pieces 22. If it is found to be desirable for certain applications the main windings may be placed only upon alternate main pole pieces with an appropriate increase in the number of turns, the remaining main pole pieces acting as consequent poles. Two sets of auxiliary windings are provided. The windings comprising one set are designated by the numeral 3 and those of the other set by the numeral 4. One winding of each of these sets is disposed upon each of the auxiliary poles. Thus it will be seen in Fig. 1 that an auxiliary winding 3 and an auxiliary winding 4 surrounds each of the auxiliary poles 23. The windings 3 are wound in an opposite direction with respect to windings 4 for the particular circuit connections shown. In the preferred form of my improved motor, windings 3 and 4 have substantially identical electrical characteristics, a saving in manufacturing cost being thus effected.

A double-pole double-throw switch 8 is mounted on the side of the motor frame 21, thus being made an integral part of the motor. It will be understood that this switch may be placed at a distance from the motor. The simple switching mechanism required makes this motor peculiarly adapted for applications in which the control switches must be placed at a relatively long distance from the motor.

The secondary which is preferably the rotor 24 is carried by shaft 25 which is rotatably mounted in bearings 27. The armature or rotor 24 may be of any one of the well known forms with closed circuit conductors that are ordinarily used in single phase motors and induction motors generally, as there is no new cooperation with the field pole structure. An ordinary squirrel cage rotor is represented.

As shown in Fig. 2, a source of alternating current 1 is connected to terminals 6 and 7 by lines 15. Terminal 6 is connected by wire 16 to point 10 of switch 8 and terminal 7 connected to main windings 2 which are in turn connected in series. Windings 3 which comprise the first set of auxiliary windings are connected in series and the windings 4 which comprise the second set of auxiliary windings are also connected in series. Wire 18 connects the first set of auxiliary windings 3 to point 12 of switch 8 and wire 19 connects the second set of auxiliary windings 4 to point 11 of switch 8. Points 10 and 14, and points 9 and 13 of switch 8 are respectively interconnected as shown. Wire 20 connects point 13 of switch 8 to common point 5 of all of the sets of coils.

In operating the motor, switch 8 is closed to connect points 11 and 9, and points 10 and 12 respectively. Thus the main windings 2 and auxiliary windings 3 are connected in series to the source of current 1 through line 15, terminal 6, wire 16, points 10 and 12, wire 18, windings 3, windings 2, wire 17 and back to line 15 from terminal 7. At the same time windings 4 are short circuited through wire 19, points 11 and 9 and wire 20. In order to reverse the direction of rotation of the armature, switch 8 is thrown to the opposite position. The main windings 2 and auxiliary windings 4 are thus connected in series to source of current 1, through line 15 to terminal 6, wire 16 to point 14 and 11, wire 19 to windings 4, through windings 2 to wire 17, then back to line 15 through terminal 7. At the same time windings 3 are short circuited through wire 18, points 12 and 13 and wire 20.

As stated above the windings 3 are wound in an opposite direction with respect to windings 4. Assuming that each of the windings 3 is wound in the same direction as the main winding on the right hand side of it, then when windings 3 and the main windings are energized each auxiliary pole and the main pole on the right hand side of it have the same polarity and may be said to form a pole unit. Due to the flux produced by the short circuited winding 4 on the auxiliary pole the total flux produced in the auxiliary pole will lag in time phase behind the flux produced in the main pole of the pole unit. Thus a shifting field is produced which causes the portion of the armature adjacent the main pole to move toward the left, that is toward the auxiliary pole of the pole unit. Following the assumption made above each of the windings 4 is wound in the same direction as the main winding on the left hand side of it. Hence when windings 4 and the main windings are energized each auxiliary pole and the main pole on the left hand side of it have the same polarity. Then when windings 3 are short circuited the armature will be caused to move in the opposite direction, that is to the right.

From the foregoing description it will be apparent that the auxiliary windings are so arranged that they may be interchangeably connected for operation as either energizing windings or short circuited windings. By such an arrangement all of the windings carry current when the motor is in operation for rotation of the armature in either direction and hence through the elimination of idle windings a material saving in coppper is effected. Furthermore, it will be noted that the reversing switch also composes a line switch which deenergizes all coils when open.

It should be understood that the term motor has been used in a broad sense of the term and is intended to include "motor type relays" of the general type shown in French Patent No. 602,928 referred to above, for example. The embodiment of my invention illustrated and described herein has been selected for the purpose of clearly setting forth the principles involved. It will be apparent, however, that the invention is susceptible of being modified to meet the different conditions encountered in its use and I therefore aim to cover by the appended claims all modifications within the true spirit and scope of my invention.

What I claim as new and desire to secure by Letters Patent of the United States, is:

1. A reversible alternating current motor comprising in combination, relatively rotatable primary and secondary members, the primary having a main winding and two sets of auxiliary exciting windings, and means for short circuiting one of said sets of auxiliary windings and energizing the other of said sets of auxiliary windings together with said main winding to form pole units shaded on one side to induce rotation in one direction, and to short circuit the last-mentioned set of auxiliary windings and energize the first set of auxiliary windings together with said main winding to form pole units shaded on the opposite side to induce rotation in the opposite direction.

2. A reversible alternating current motor comprising in combination a rotatably mounted armature and a stator including a plurality of main windings and two sets of auxiliary exciting windings, at least one winding of each of said sets disposed intermediate said main windings, and means for short circuiting one of said sets of auxiliary windings and energizing the other of said sets of auxiliary windings together with adjacent main windings to form pole units shaded on one side to induce rotation of the armature in one direction, and to short circuit the last-mentioned set of auxiliary windings and energize the first set of auxiliary windings together with adjacent main windings to form pole units shaded on the opposite side to induce rotation of the armature in the opposite direction.

3. In combination, a source of alternating current, a reversible alternating current motor comprising a rotatably mounted armature and a stator including a plurality of main windings and two sets of auxiliary windings said auxiliary windings being arranged in pairs intermediate said main windings each of said pairs comprising one winding of each of said sets, and selectively operable means arranged to connect said main windings and the first set of auxiliary windings to said source of current and short circuit the second of said sets of auxiliary windings for inducing rotation of said armature in one direction and to connect said main windings and said second set of auxiliary windings to said source of current and short circuit said first set of auxiliary windings for inducing rotation of said armature in the opposite direction.

4. In combination with a source of alternating current, a reversible alternating current motor comprising a rotatably mounted armature, a stator including a plurality of main windings, and two sets of auxiliary windings said auxiliary windings being arranged in concentric pairs intermediate said main windings each of said concentric pairs comprising one winding of each of said sets, and a switch arranged to connect said main windings and the first of said sets of auxiliary windings to said source of current and short circuit the second of said sets of auxiliary windings for inducing rotation of said armature in one direction and to connect said main windings and said second set of auxiliary windings to said source of current and short circuit said first set of auxiliary windings for inducing rotation of said armature in the opposite direction.

5. In combination a reversible alternating current motor comprising a rotatably mounted armature and a stator including a main winding, and two sets of auxiliary windings arranged to produce magnetic poles of opposite polarity, and means for selectively short circuiting one of said sets and connecting the other of said sets in circuit with said main winding.

6. In combination, a reversible alternating current motor comprising a rotatably mounted armature and a stator including a plurality of main windings and two sets of auxiliary windings arranged to produce magnetic poles of opposite polarity at least one winding of each of said sets disposed intermediate said main windings, and means for selectively short circuiting one of said sets and connecting the other of said sets in circuit with said main windings.

7. A reversible alternating current motor having a primary member of the shaded pole variety and a relatively rotatable secondary member, the primary being provided with energizing and flux shading windings to produce rotation of the secondary in one direction, and means for connecting a portion of the energizing winding for said one direction of rotation as a flux shading winding which shades the remainder of the energizing winding on the opposite side, and to connect said first mentioned flux shading winding as an energizing winding, for producing rotation of the secondary in the opposite direction.

8. A reversible alternating current motor of the shaded pole variety having relatively rotatable primary and secondary members, the primary having a main energizing winding section and two auxiliary winding sections, and means to connect one auxiliary winding section as an energizing winding for producing rotation in one direction and as a flux shading winding for the opposite direction of rotation and to connect the other auxiliary winding section as a flux shading winding for the first-mentioned direction of rotation and as an energizing winding for producing rotation in the opposite direction.

9. A single-phase reversible alternating current motor of the shaded pole variety having relatively rotatable primary and secondary members, the primary member having main and auxiliary pole sections alternately arranged, a coil on each main pole section and a pair of coils on each auxiliary pole section, means for energizing the coils on the main pole sections and one set of coils on the auxiliary pole sections for one direction of rotation and the coils on the main pole sections and the other set of coils on the auxiliary pole sections for the opposite direction of rotation, said auxiliary coils on the same auxiliary poles being arranged to produce magnetic poles of opposite polarity and means for short circuiting the remaining set of auxiliary coils in both cases.

10. A reversible single-phase alternating current motor of the shaded pole variety having relatively rotatable primary and secondary windings, the primary member having main and auxiliary pole pieces spaced alternately, a coil on each main pole piece and a pair of coils on each auxiliary pole piece, means for energizing the coils on the main pole pieces to produce main pole fluxes of alternate polarity for both directions of rotation and for energizing one set of auxiliary coils to produce auxiliary pole fluxes of alternating polarity and short circuiting the other auxiliary windings for one direction of rotation and for energizing the last mentioned set of auxiliary coils in such manner as to produce a reversed polarity of the auxiliary poles and short circuiting the first mentioned auxiliary coils for the opposite direction of rotation.

RICHARD R. WOLFE.